UNITED STATES PATENT OFFICE.

RICHARD WILLSTÄTTER, OF BERLIN-DAHLEM, GERMANY.

PROCESS OF PREPARING SOLUTIONS OF CELLULOSE.

1,141,510.  Specification of Letters Patent.  Patented June 1, 1915.

No Drawing.   Application filed May 14, 1914. Serial No. 838,476.

*To all whom it may concern:*

Be it known that I, RICHARD WILLSTÄTTER, a citizen of the German Empire, and a resident of Berlin-Dahlem, Germany, have invented a certain new and useful Process of Preparing Solutions of Cellulose, of which the following is a specification.

My invention relates to the preparation of solutions of cellulose and consists in dissolving cellulose in a specially selected hydrochloric acid, the action of which is such as to dissolve substantially the whole of the cellulose.

While it has long been known that cellulose is attacked and partially dissolved by strong or fuming hydrochloric acid after a long exposure to its action this chemical observation has not led to any practical results and the reaction has not been employed in commerce, mainly for the reason that the action is slow and difficult at ordinary temperatures. For example, the ordinary commercial fuming HCl, if shaken up with cellulose for a day, will result only in a defibrization and gelatinization of the cellulose without producing solution of more than a part of the cellulose. I have now discovered that whereas there is no material difference in the results obtained by using ordinary commercial hydrochloric acid of varying strengths a very marked result can be achieved by the use of hydrochloric acid containing 39.5% HCl or upward. This special acid which is not generally available as an ordinary commercial acid, can, however, be readily prepared from the better grades of the market. When such acid is employed the cellulose is dissolved rapidly and more or less completely, thereby making it possible to use the process on a commercial basis. This special hydrochloric acid, such as at present has little, if any, commercial application, can be obtained by building up at comparatively low temperatures the technical acids of the market by means of hydrogen chlorid. These special acids behave very differently toward cellulose than the ordinary strong hydrochloric acid mentioned in the prior literature. They bring the cellulose into solution quickly and substantially completely. Cellulose, hydro-, hydrate- and oxycellulose, as well as cellulose which exists in combined form can all be turned into dissolved form by the use of these special acids. Cellulose is thus capable of being dissolved out of wood and other cellulose-containing substances with substantial readiness and completeness. Hydrochloric acids of strengths for example of 40.8% and 41.4% HCl give respectively 12% and 15% cellulose solutions or homogeneous mixtures with cellulose. This action of hydrochloric acid, I have found, begins when the acid contains 39% HCl. Commercially good results are obtained when the acid reaches at least 39.5% HCl. The ordinary fuming acid does not possess the qualities necessary to produce the results aimed at.

At low and at ordinary temperatures, the hydrochloric acid has only a rather slow hydrolitic breaking down action on cellulose. For this reason, the polyose, through removal of HCl by suction with or without dilution of the solution or directly through dilution with, for example, alcohol, water, salt solution, dilute acids or alkalis, is precipitated as an elastic, or gelatinous mass or it may be brought into filament form by squirting under pressure through nozzles. The solutions are suitable for obtaining cellulose, for preparing cellulose-esters and for producing elastic masses for use in making films, artificial silk, etc.

In order to illustrate more clearly in what manner my invention may be carried out the following examples are given, it being understood, of course, that they are for illustrative purposes merely and are in no sense to be regarded as limiting my invention. The parts mentioned in the examples are by weight.

Example 1: 1 part cotton is kneaded for a short time at 15° C. with 12 to 15 parts of hydrochloric acid (density 1.209 at 15° C.) until a viscous fluid results. From this fluid a large part of the hydrochloric acid gas is removed by suction (as are also the air bubbles) and the gas is then recovered, after which the remaining solution may be pressed through a nozzle into water, which latter acts as a coagulating fluid.

Example 2: 1 part cellulose material is treated in a kneading apparatus with 6 to 8 parts of hydrochloric acid (density 1.212 at 15° C.) until it has become a viscous, practically clear mass; it is then allowed to stand for a short time in order to diminish its viscosity, after which coagulation in colloids may be accomplished according to known processes.

Example 3: 1 part fine wood meal is stirred at ordinary temperatures with 7 parts of hydrochloric acid (density 1.212 at 15° C.) for about a half hour and the result is allowed to stand for from a quarter to a half hour. It is then filtered off from the insoluble lignin and precipitated.

The process described in this specification begins to be effective after the specific gravity of the acid passes 1.199 at 15° C., increasing in effectiveness as the acid becomes denser. This fact is expressed in the claims in terms of percentages rather than of specific weights.

I claim:

1. The process of producing solutions containing dissolved cellulose which comprises treating the cellulose with hydrochloric acid containing not less than 39% HCl.

2. In the art of preparing cellulose products the improvement which comprises dissolving the cellulose in hydrochloric acid containing not less than 39% HCl.

3. In the art of preparing cellulose products the improvement which comprises dissolving the cellulose in hydrochloric acid containing not less than 39.5% HCl.

In testimony whereof, I have hereunto set my hand in the presence of two subscribing witnesses.

RICHARD WILLSTÄTTER.

Witnesses:
WOLDEMAR HAUPT,
HENRY HASPER.